United States Patent Office 3,317,662
Patented May 2, 1967

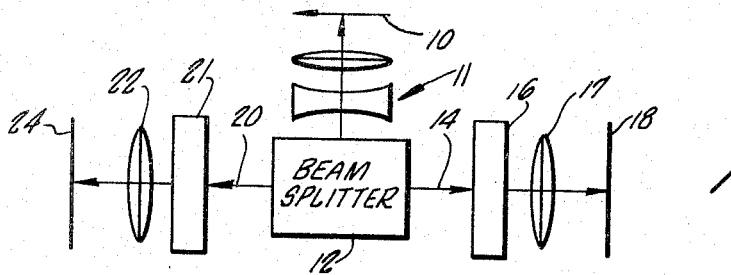
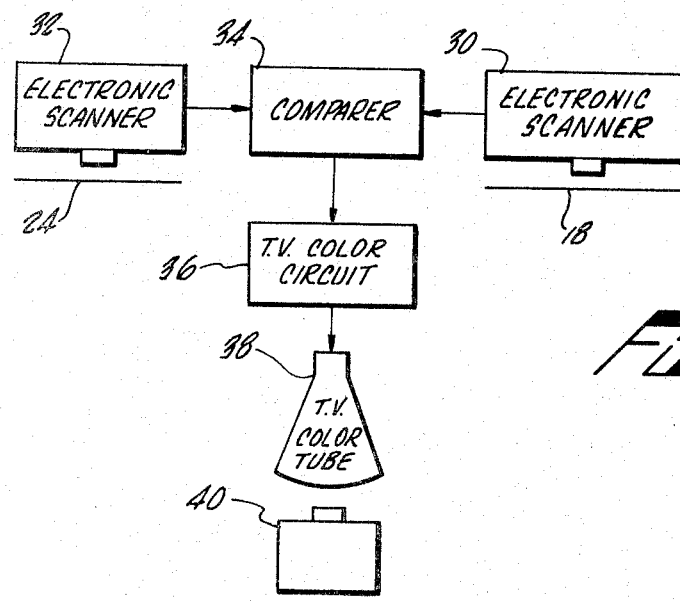
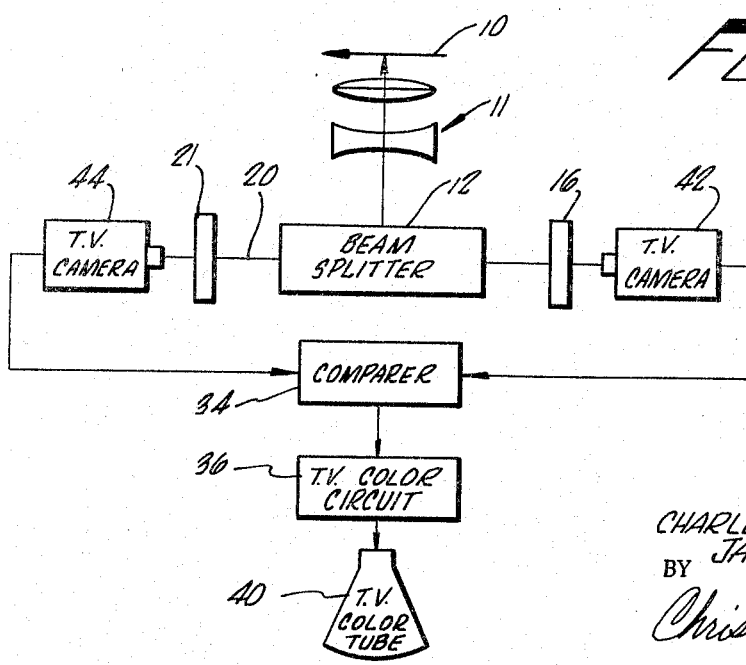

3,317,662
COLOR DETECTION UTILIZING A CHROMATIC ABSORPTION FILTER
Charles F. Robinson, Pasadena, Calif., and James Reekie Wilmette, Ill., assignors to Bell & Howell Company, Chicago, Ill., a corporation of Illinois
Filed Apr. 10, 1964, Ser. No. 358,905
18 Claims. (Cl. 178—5.4)

This invention relates to determining color information from objects.

In terms of method, a first image of an object is formed in black and white, and a second image of the object is also formed in black and white identical with the first image, except that the intensity of each part of the second image varies from a corresponding part of the first image in accordance with the wave length of the light forming the corresponding parts. For example, if the difference in intensity of a corresponding part of an image is relatively small, this indicates a color near one end of the visible spectrum; if the difference is somewhat large, the color is near the middle of the spectrum, and if the difference in intensity is larger still, the color is near the other end of the spectrum.

In one form of the method, the variation in the second image is obtained by passing light from the object through a filter with an optical density which varies in accordance with the wave length of the light passing through it. For example, a typical variable density colored filter having a property of selective chromatic absorption, preferably has a density of 0.2 to blue light, 0.5 to green, and 0.8 to red. Conveniently, the two images are recorded on conventional black and white photographic film. If the optical density of the negative image of a picture element photographed through the film is but slightly less than that of the corresponding picture element photographed in the absence of the filter, the color of that picture element is blue. If the difference in density is slightly larger, the color of the picture element is green; and if the density difference is greater yet, the color is red.

In one method, the two images are recorded on conventional black and white photographic film, and "read" by a conventional electric scanning technique which compares the optical density of corresponding elements of the recorded images, and develops an electrical signal accordingly. The signal is applied to a TV color circuit which produces a color image in a TV color picture tube.

In another form, the images are each focused in a respective TV black and white camera. The signals from the two cameras are compared to develop an appropriate "chromatic" signal which is recorded on magnetic tape or transmitted directly to a TV color picture tube. The intensity of the chromatic signal is properly controlled by an intensity signal from the image which has not been selectively chromatically filtered.

In an alternate form of the method, the first image of the object is formed through a neutral filter which has an optical density of, say, 0.5, if the variable density filter has the properties outlined above. Then, if the optical density of the negative image of a picture element photographed through the variable filter is higher than that of the corresponding picture element formed through the neutral filter, the color of that picture element is blue. If the densities are the same, the color is green. If the optical density of the negative image of a picture element photographed through the variable filter is lower than that photographed through the neutral filter, that picture element is red.

In terms of apparatus, the invention includes a light filter with an optical density which varies with color of light passing through it. Means are provided for passing light from the object through the filter, and forming an image with the light. Means are also provided for forming another image of the object with light which does not pass through the filter. Means are also provided for recording the light which forms the two images.

In one form of the apparatus, a neutral filter is used so that one image is formed after the light passes through the variable density filter, and another image is formed by light after it passes through the neutral filter. Black and white photographic film is used for recording the images.

The preferred form of the apparatus also includes means for comparing the intensity of light recorded in corresponding elements of the two images, and for developing an electrical signal in response to the differences so the signal can be fed to a color TV circuit for producing a color picture.

These and other aspects of the invention will be more fully understood by the following detailed description and the accompanying drawings, in which:

FIG. 1 is a schematic diagram showing one system for the simultaneous recording of two images of the same object;

FIG. 2 is a block diagram showing a system for electronically scanning the two images formed by the system of FIG. 1 to develop an electrical signal which produces a color TV picture; and FIG. 3 is a schematic diagram of another system.

Referring to FIG. 1, light from an object 10 passes through a lens system 11 and a conventional beam-splitter 12 which directs part of the light from the image along a path 14 through a conventional neutral light filter 16 having an optical density of 0.5 to all wave lengths of visible light. The light passing through the filter is focused by a lens 17 to form a first image on a first sheet of conventional black and white photographic film 18.

Other light from the beam-splitter is directed along a path 20 through a variable density filter 21 and through a lens 22 which focuses a second image on a second sheet of conventional black and white photographic film 24. As an example, the variable density filter has an optical density which varies from 0.2 to blue light to 0.5 to green light, to 0.8 for red light. A Wratten No. 86A gelatin filter is also a typical variable density filter which may be used.

When the apparatus of FIG. 1 is operated to form the two images; any portion of the object which is colored blue produces an optical density in the negative of the second image greater than that of the corresponding element photographed through the neutral filter. Any part of the object which is green prodces an optical density in the negative of the second image which is equal to that in the first image. Any part of the object which is red produces a negative density in the second image lower than that of the corresponding part of the first image.

The apparatus in FIG. 2 shows how the two images are "read" to produce a color picture. A first conventional photoelectric scanner 30 sweeps across the first black and whilte image formed on the first sheet 18 of the photographic film. A second photoelectric scanner 32 synchronized with the first scans the second black and white image formed on the second sheet 24 of photographic film. The electric signals developed by the electronic scanner are fed into a conventional comparer 34 which develops an electronic chromatic signal in accordance with the difference between the intensity of corresponding parts of the two images. If the signal from the second scanner is higher than that from the first scanner, the comparer forms a signal which, when passed through a TV color circuit 36, forms a blue color in the appropriate spot of a TV color tube 38. If the two signals from the scanners are the same, the comparer develops a signal which produces a green color at the appropriate spot on the color tube, and if the signal from the second scanner is lower than that from the first, a red color is formed at the appropriate point of the TV color tube. The comparer also develops a signal in response to the density of the first image so that the intensity of the color produced by the TV color tube corresponds to that color as it originally appears in the object.

If desired, a permanent color print of the object image is made by photographing the image on the TV color tube with a camera 40. In this way, color and density information stored on the black and white film is retrieved in color print.

The system shown in FIG. 3 is similar to that of FIG. 1, except that the first and second sheets of black and white film are replaced by first and second conventional black and white TV cameras 42, 44, respectively.

The signal from each camera is fed to the comparer 34, which develops a chromatic electrical signal in accordance with the difference in the signals from the two TV cameras, and also develops a light intensity signal in accordance with the signal from the first TV camera. The chromatic and intensity signals are fed to the TV color circuit and the TV color picture tube to present a color picture of the object. The advantage of the apparatus in FIG. 3 is that color TV transmission is achieved by using only conventional black and white TV cameras.

We claim:

1. A method for storing optical information about an image of an object, the method comprising passing light from the object through a first substantially panchromatic optical path, forming a first image of the object in black and white with light passing through the first path, passing light from the object through a second optical path having a property of selective chromatic absorption different from the first path, and forming a second image of the object in black and white with light passing through the second path so the intensity of each part of the second image varies from a corresponding part of the first image in accordance with the wave length of the light forming the said corresponding parts.

2. A method for storing optical information about an image of an object, the method comprising passing light from the object through a first substantially panchromatic optical path, forming a first image of the object in black and white with light passing through the first path, recording the first image on black and white photographic film, passing light from the object through a second optical path having a property of selective chromatic absorption, forming a second image of the object in black and white with light passing through the second path so the intensity of each part of the second image varies from a corresponding part of the first image in accordance with the wave length of the light forming the said corresponding parts, and recording the second image on black and white photographic film.

3. A method for obtaining optical information about an image of an object, the method comprising passing light from the object through a first optical path, forming a first image of the object in black and white with light passing through the first path, recording the first image on black and white photographic film, passing light from the object through a second optical path having a property of selective chromatic absorption, forming a second image of the object in black and white with light passing through the second path so the intensity of each part of the second image varies from a corresponding part of the first image in accordance with the wave length of the light forming the said corresponding parts, and recording the second image on black and white photographic film, and thereafter scanning the two images electronically to develop a chromatic electrical signal.

4. A method for obtaining optical information about an image of an object, the method comprising passing light from the object through a first optical path, forming a first image of the object in black and white with light passing through the first path in a first black and white television camera, passing light from the object through a second optical path having a property of selective chromatic absorption, forming in a second black and white television camera a second image of the object in black and white with light passing through the second path so the intensity of each part of the second image varies from a corresponding part of the first image in accordance with the wave length of the light forming the said corresponding parts, and comparing the signals from the two television cameras to develop a chromatic electrical signal.

5. A method for obtaining optical information about an image of an object, the method comprising passing light from the object through a first optical path, forming a first image of the object in black and white with light passing through the first path in a first black and white television camera, passing light from the object through a second optical path having a property of selective chromatic absorption, forming in a second black and white television camera a second image of the object in black and white with light passing through the second path so the intensity of each part of the second image varies from a corresponding part of the first image in accordance with the wave length of the light forming the said corresponding parts, electronically comparing the signals from the two television cameras to develop a chromatic electrical signal, and feeding the chromatic signal to a color television circuit and color picture tube to form a color picture.

6. A method for obtaining optical information about an image of an object, the method comprising passing light from the object through a first optical path, forming a first image of the object in black and white with light passing through the first path in a first black and white television camera, passing light from the object through a second optical path having a property of selective chromatic absorption, forming in a second black and white television camera a second image of the object in black and white with light passing through the second path so the intensity of each part of the second image varies from a corresponding part of the first image in accordance with the wave length of the light forming the said corresponding parts, electronically comparing the signals from the two television cameras to develop a chromatic electrical signal, feeding the chromatic signal to a color television circuit and color picture tube to form a color picture, and photographing the picture on the color picture tube with color film.

7. Apparatus for recording an image of an object, the apparatus comprising a first image-forming system for forming a first image with light from the object, a second image-forming system for forming a second image with light from the object, and a light filter with an optical density which varies with color of light passing through it disposed in the path of light passing through one of the image-forming systems.

8. Apparatus for recording an image of an object, the apparatus comprising a first image-forming system for forming a first image with light from the object, a first television camera for recording the first image, a second image-forming system for forming a second image with light from the object, a second television camera for recording the second image, a light filter with an optical density which varies with color of light passing through it disposed in the path of light passing through one of the image-forming systems, and means for comparing the signals from the television cameras to develop a chromatic electrical signal.

9. Apparatus for recording an image of an object, the apparatus comprising a first image-forming system for forming a first image with light from the object, a second image-forming system for forming a second image with light from the object, a light filter with an optical density which varies with color of light passing through it disposed in the path of light passing through one of the image-forming systems, and means for recording the two images on black and white photographic film.

10. Apparatus for recording an image of an object, the apparatus comprising a first image-forming system for forming a first image with light from the object, a second image-forming system for forming a second image with light from the object, a light filter with an optical density which varies with color of light passing through it disposed in the path of light passing through one of the image-forming systems, means for recording the two images on black and white photographic film, and means for electronically scanning the two images to develop electric signals responsive to the optical density of the images, and means for comparing the two signals to develop a chromatic electrical signal.

11. Apparatus for recording an image of an object, the apparatus comprising a first neutral light filter, a second light filter with an optical density which varies with color of light passing through it, means for separately transmitting light from the object through the two filters, and means for recording the light passing through the filters.

12. Apparatus for recording an image of an object, the apparatus comprising a first neutral light filter, a second light filter with an optical density which varies with color of light passing through it, means for separately transmitting light from the object through the two filters, and means for separately forming images of the light passing through the filters.

13. A method for obtaining optical information about an image of an object, the method comprising passing light from the object through a first optical path, forming a first image of the object in black and white with light passing through the first path, passing light from the object through a second optical path having a property of selective chromatic absorption different from the first path, and forming a second image of the object in black and white with light passing through the second path so the intensity of each part of the second image varies from a corresponding part of the first image in accordance with the wave length of the light forming the said corresponding parts, and thereafter scanning the two images electronically to develop a chromatic electrical signal.

14. A method for storing optical information about an image of an object, the method comprising passing light from the object through a first optical path, forming a first image of the object through a first optical path, forming a first image of the object in black and white with light passing through the first path, passing light from the object through a second optical path having a property of chromatic absorption which varies with color of light passing through it, and forming a second image of the object in black and white with light passing through the second path so the intensity of each part of the second image varies from a corresponding part of the first image in accordance with the wave length of the light forming the said corresponding parts.

15. A method for storing optical information about an image of an object, the method comprising passing light from the object through a first optical path, forming a first image of the object in black and white with light passing through the first path, recording the first image on black and white photographic film, passing light from the object through a second optical path having a property of chromatic absorption which varies with color of light passing through it, forming a second image of the object in black and white with light passing through the second path so the intensity of each part of the second image varies from a corresponding part of the first image in accordance with the wave length of the light forming the said corresponding parts, and recording the second image on black and white photographic film.

16. A method for obtaining optical information about an image of an object, the method comprising passing light from the object through a first optical path, forming a first image of the object in black and white with light passing through the first path in a first black and white television camera, passing light from the object through a second optical path having a property of chromatic absorption which varies with color of light passing through it, forming in a second black and white television camera a second image of the object in black and white with light passing through the second path so the intensity of each part of the second image varies from a corresponding part of the first image in accordance with the wave length of the light forming the said corresponding parts, and comparing the signals from the two television cameras to develop a chromatic electrical signal.

17. A method for obtaining optical information about an image of an object, the method comprising passing light from the object through a first optical path, forming a first image of the object in black and white with light passing through the first path in a first black and white television camera, passing light from the object through a second optical path having a property of chromatic absorption which varies with color of light passing through it, forming in a second black and white television camera a second image of the object in black and white with light passing through the second path so the intensity of each part of the second image varies from a corresponding part of the first image in accordance with the wave length of the light forming the said corresponding parts, electronically comparing the signals from the two television cameras to develop a chromatic electrical signal, and feeding the chromatic signal to a color television circuit and color picture tube to form a color picture.

18. A method for obtaining optical information about an image of an object, the method comprising passing light from the object through a first optical path, forming a first image of the object in black and white with light passing through the first path in a first black and white television camera, passing light from the object through a second optical path having a property of chromatic absorption which varies with color of light passing through it, forming in a second black and white television camera a second image of the object in black and white with light passing through the second path so the intensity of each part of the second image varies from a corresponding part of the first image in accordance with the wave length of the light forming the said corresponding parts, electronically comparing the signals from the two television cameras to develop a chromatic electrical signal, feeding the chromatic signal to a color television circuit and color picture tube to form a color picture, and photographing the picture on the color picture tube with color film.

References Cited by the Examiner

UNITED STATES PATENTS

| | | | |
|---|---|---|---|
| 3,003,391 | 10/1961 | Land | 88—16.4 |
| 3,078,340 | 2/1963 | Willey | 178—6.7 |
| 3,255,305 | 6/1966 | Chatten | 178—5.2 |

DAVID G. REDINBAUGH, *Primary Examiner.*

J. A. O'BRIEN, *Assistant Examiner.*